(12) United States Patent
Gouws et al.

(10) Patent No.: US 11,514,079 B1
(45) Date of Patent: Nov. 29, 2022

(54) PEER-BASED ACCESS TO DISTRIBUTED DATABASE

(71) Applicant: Amazon Technologies, Inc., Seattle, WA (US)

(72) Inventors: Almero Gouws, Seattle, WA (US); Derek William Richard Chen-Becker, Centennial, CO (US); Haifeng He, Redmond, WA (US); Varsha Ganesh, North Bend, WA (US); Akshat Vig, Seattle, WA (US); Benny Tran, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/698,135

(22) Filed: Nov. 27, 2019

(51) Int. Cl.
*G06F 16/27* (2019.01)
*G06F 16/25* (2019.01)
*G06F 21/44* (2013.01)

(52) U.S. Cl.
CPC .......... *G06F 16/278* (2019.01); *G06F 16/252* (2019.01); *G06F 21/44* (2013.01)

(58) Field of Classification Search
CPC ....... G06F 16/278; G06F 16/252; G06F 21/44
USPC ........................................................ 707/736
See application file for complete search history.

(56) References Cited

U.S. PATENT DOCUMENTS

| | | | | |
|---|---|---|---|---|
| 8,290,919 B1* | 10/2012 | Kelly | ..................... | G06F 16/137 707/968 |
| 8,392,368 B1* | 3/2013 | Kelly | ..................... | G06F 16/182 707/634 |
| 9,294,558 B1* | 3/2016 | Vincent | ............... | H04L 67/1004 |
| 9,489,443 B1* | 11/2016 | Muniswamy-Reddy | ..................... | G06F 16/27 |
| 9,569,519 B2* | 2/2017 | Stephan, III | .......... | G06F 16/278 |
| 10,346,367 B1* | 7/2019 | Luszcz | ................... | G06F 16/182 |
| 2012/0131093 A1* | 5/2012 | Hamano | ............... | G06F 9/5088 709/203 |
| 2013/0332484 A1* | 12/2013 | Gajic | ...................... | G06F 16/20 707/770 |
| 2015/0178328 A1* | 6/2015 | Stephan, III | .......... | G06F 16/278 707/803 |

(Continued)

FOREIGN PATENT DOCUMENTS

CA 2845312 A1 * 2/2013 ....... G06F 17/30283

OTHER PUBLICATIONS

Ozsu et al, Principles of Distributed Database Systems 2011, 3d ed., TOC, Chapters 1,16 [found at https://ia800209.us.archive.org/35/items/2011PrinciplesOfDistributedDatabaseSystems3rdEditionM.TamerOzsuPatrickValduriez/2011%20-%20Principles%20of%20Distributed%20Database%20Systems%20%283rd%20Edition%29%20%28M.%20]Tamer%20%C3%96zsu%2C%20Patrick%20Valduriez%29.pdf.*

(Continued)

*Primary Examiner* — Phuong Thao Cao
(74) *Attorney, Agent, or Firm* — Davis Wright Tremaine LLP

(57) ABSTRACT

A distributed database management system comprises a plurality of peers and maintains data on behalf of a plurality of clients. Upon receiving a request to access data, the distributed database management system identifies, from among the plurality of peers, a set of peers associated with the client issuing the request. The distributed database management system provides, to the client, a list of the set of identified peers. Access to data maintained by the distributed database system is based, at least in part, on connections between the client and the set of identified peers.

20 Claims, 9 Drawing Sheets

(56) References Cited

U.S. PATENT DOCUMENTS

| | | | | |
|---|---|---|---|---|
| 2015/0186479 | A1* | 7/2015 | Konersmann | H04L 67/1097 707/809 |
| 2016/0292171 | A1* | 10/2016 | Bhagat | G06F 16/134 |
| 2016/0342619 | A1* | 11/2016 | Lipcon | G06F 12/0804 |
| 2016/0350392 | A1* | 12/2016 | Rice | G06F 16/2282 |
| 2017/0103116 | A1* | 4/2017 | Hu | G06F 16/252 |
| 2017/0161327 | A1* | 6/2017 | Lu | G06F 16/256 |
| 2018/0205552 | A1* | 7/2018 | Struttmann | H04L 9/3242 |
| 2019/0164157 | A1* | 5/2019 | Balaraman | H04L 9/3239 |
| 2019/0318129 | A1* | 10/2019 | David | H04L 9/3239 |
| 2019/0340274 | A1* | 11/2019 | Keller | G06F 16/2282 |

OTHER PUBLICATIONS

LawrenceC et al., How does Bittorrent work? Apr. 25, 2011, superuser.com, https://superuser.com/questions/245390/how-does-bittorrent-work/274995#274995.*

Cohen, The BitTorrent Protocol Specification Feb. 4, 2017, BitTorrent.org, https://www.bittorrent.org/beps/bep_0003.html.*

Da Silva Rodrigues, Analyzing Peer Selection Policies for Bittorrent Multimedia On-Demand Streaming Systems in Internet Jan. 14, IJCNC, pp. 203-221.*

Thomas Jensen, Slow and strange network after bittorrent downloads Jan. 18, 2016, superuser.com, https://superuser.com/questions/912760/slow-and-strange-network-after-bittorrent-downloads.*

KodiThomson50, Is there a file system best suited for a torrent partition? Mar. 2, 2019, askubuntu.com, https://askubuntu.com/questions/36035/is-there-a-file-system-best-suited-for-a-torrent-partition.*

Ozsu et al, Principles of Distributed Database Systems 2011, 3d ed., 866 pages.*

PostgreSQL 11 Documentation Section 5.10: Table Partitioning date unknown [captured on Nov. 6, 2018 by archive.org],postgresql.org, https://web.archive.org/web/20181106223816/https://www.postgresql.org/docs/11/ddl-partitioning.html.*

* cited by examiner

| address | peer version | schema version | token range | client |
|---|---|---|---|---|
| | | | | |
| | | | | |
| 127.1.1.15 | 1.0 | 1.1 | A-G | A |
| 127.1.1.33 | 1.0 | 1.1 | H-P | A,B |
| 127.1.1.24 | 1.0 | 1.1 | Q-Z | A | excluded row 602
included row 604
excluded column 606

PEER-BASED ACCESS TO DISTRIBUTED DATABASE

BACKGROUND

Distributed database systems may be called upon to provide scalable and reliable access to data. In some distributed database systems, the system maintains data on a cluster of servers and replicates data between the servers. In some cases, the servers may each operate as independent entities, and no one server is considered to be the master. A distributed database system employing this approach may provide increased scalability and reliability compared to some systems. However, further improvements to scalability and reliability may be made. Support for multitenancy in such systems may also be improved.

BRIEF DESCRIPTION OF THE DRAWINGS

Various techniques will be described with reference to the drawings, in which:

FIG. 6 illustrates an example of a client view of peer metadata, in accordance with at least one embodiment;

DETAILED DESCRIPTION

In an example of a distributed database system, data is maintained by the distributed database system on behalf of a plurality of clients. The distributed database system comprises a plurality of peers. The individual peers may also be multitenant, in that a particular peer may maintain data for more than one client. When a client accesses the distributed database system, the distributed database system identifies a set of peers that are associated with maintaining that client's data, while excluding peers that are not associated with that client. A list describing this set is provided to the client device. Subsequent interactions with the distributed database system are such that the distributed database appears to the client as being a single tenant system, and the operation of the distributed database system is facilitated according to the selected set of peers. For example, connections to the distributed database may be made directly to the selected set of peers, as indicated in a peers list provided to the client device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of computing configuration management is improved by the provision of techniques, embodiments of which are described herein, for indexing configuration data and facilitating the efficient retrieval of configuration data.

Figure 1:
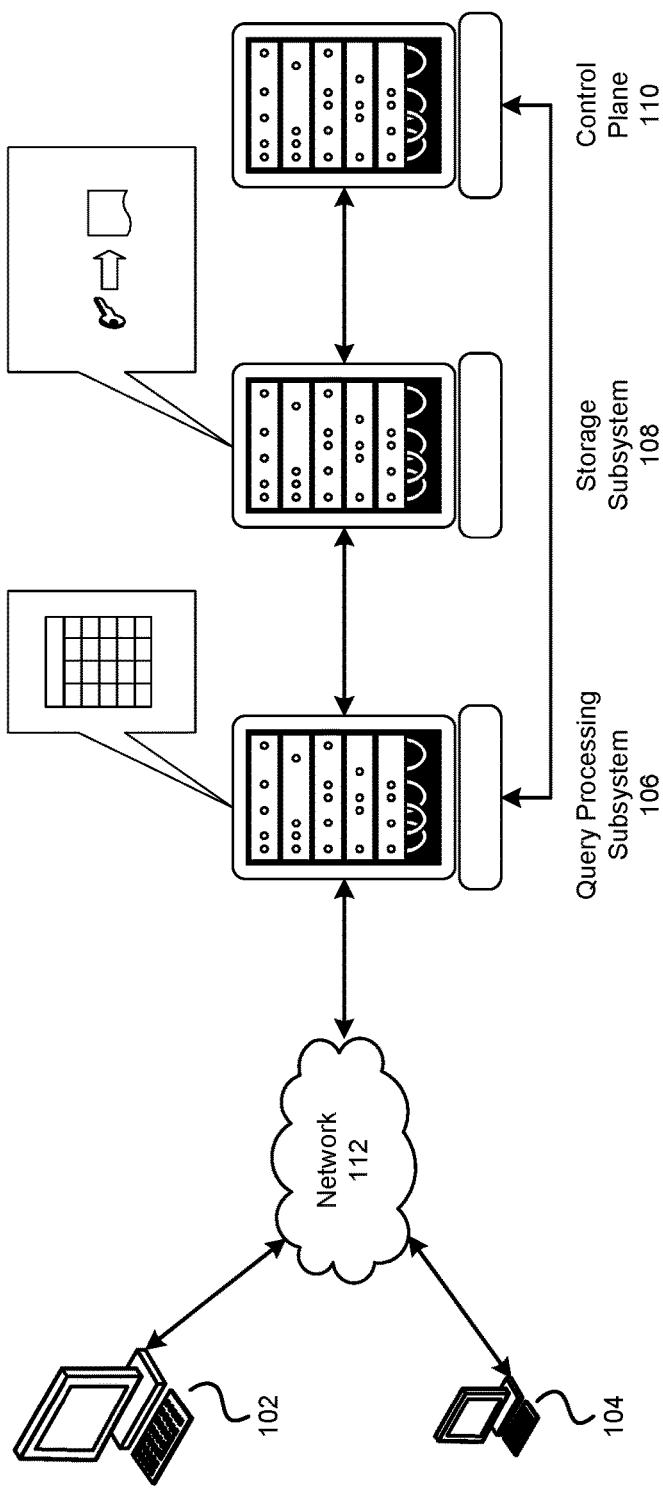
FIG. 1 illustrates an example distributed database system, in accordance with at least one embodiment.

FIG. 1 illustrates an example distributed database system, in accordance with at least one embodiment. In the example of FIG. 1, a distributed database system 100 is a multi-tenant database system, capable of storing data on behalf of a plurality of clients 102, 104. The distributed database system 100 may be described as multi-tenant because data maintained by the system 100 on behalf of one client 102 is not generally visible to another client 104.

In the example of FIG. 1, the distributed database system 100 comprises a query processing subsystem 106, storage subsystem 108, and control plane 110.

A client 102, 104 may comprise a computing device, computing process, hosted computing service, and so forth. A client, as used herein, generally refers to a client device associated with a particular entity, such as a customer of a hosted distributed database service.

In at least one embodiment of the depicted system 100, interaction between a client 102, 104 and the distributed database system 100 is performed using an interaction protocol that defines a format for exchanging messages between a client 102, 104 and the distributed database system 100. A client 102, 104 may comprise a driver module, or other software, that implements an interaction protocol. Clients 102, 104 may communicate with the distributed database system 100 via a network 112, e.g. by transmitting messages via an interaction protocol to a front-end system, such as to a node or other element of a query processing subsystem 106.

In the example of FIG. 1, query processing subsystem 106 comprises a plurality of front-end nodes, which may also be described as front-end peers, query processing peers, or as peers. In at least one embodiment of the depicted system 100, front-end nodes are added to or removed from the front-end 106 to scale according to demands on capacity or utilization.

In at least one embodiment of the depicted system 100, query processing subsystem 106 provides table-oriented access to data maintained by the distributed database system 100. Table-oriented, or tabular, access refers, in part, to the data being accessed in terms of tables, e.g., as rows and columns of table.

In at least one embodiment of the depicted system 100, query processing subsystem 106 provides access to data specified in terms of a table-oriented query language, such as structured query language ("SQL") or Cassandra query language ("CQL"). In at least one embodiment of the depicted system 100, access to data is table-oriented but non-relational. As such, a query language supported by the query processing subsystem 106 may be a subset of a relational query language, such as SQL.

In at least one embodiment of the depicted system 100, query processing subsystem 106 comprises a query parser and query planner. When a query is received from a client 102, 104, the query parser analyzes the query, identifies the query's constituent keywords and clauses, and determines the query's meaning. The query planner then formulates a plan for executing the query. In at least one embodiment of the depicted system 100, the query processing subsystem 106 then executes the query plan.

In at least one embodiment of the depicted system 100, each node of the query processing subsystem 106 is independently capable of performing the aforementioned functions of the query parser and query planner, and of executing the generated query plan. In at least one embodiment of the depicted system 100, execution of a generated query plan comprises interaction with one or more storage nodes of a storage subsystem 108.

In the example of FIG. 1, storage subsystem 108 comprises a plurality of storage nodes, which may also be describe as storage peers, or as peers. The term peer may also be used to refer to a combination of one or more query processing peers and one or more storage peers.

In at least one embodiment of the depicted system 100, storage nodes are added to or removed from the storage subsystem 108 to scale according to demands on capacity or utilization.

In at least one embodiment of the depicted system 100, the storage subsystem 108 operates as a key-value, non-relational data store. The storage subsystem 108, in at least one embodiment of the depicted distributed database system 100, is a key-value or key-to-values data store having comparatively high scaling properties, but comparatively limited query capabilities. For example, while embodiments of the query processing subsystem 106 may provide support for SQL or CQL queries, embodiments of the storage subsystem may instead support comparatively primitive operations which store and retrieve individual values, or collections of values, based on a key value. The storage subsystem 108 may, in some embodiments, provide limited support for range queries, e.g. by providing for the retrieval of values, or collections of values, associated with a range of key values. In at least one embodiment of the depicted distributed database system 100, these limitations allow the system 100 to be highly scalable, and to facilitate implementation of a range of replication models and approaches to multi-tenancy.

In at least one embodiment of the depicted system 100, a control plane 110 facilitates scaling the capacity of the query processing subsystem 106. The control plane 110 may, for example, monitor actual or forecast capacity utilization of the query processing subsystem 106 and add or remove query processing nodes accordingly.

In at least one embodiment of the depicted system 100, a control plane 110 facilitates scaling the capacity of the storage subsystem 108. The control plane 110 may, for example, monitor actual or forecast capacity utilization of the storage subsystem 108 and add or remove storage nodes to the subsystem.

In at least one embodiment of the depicted system 100, the control plane 110 facilitates management of capacity utilization by respective clients 102, 104. For example, the control plane 110 may monitor capacity utilization by clients 102, 104 and determine allocations of partitions among storage nodes of the storage subsystem 108. Similarly, the control plane 110 may determine how many and which query processing nodes the clients 102, 104 should have access to.

Figure 2:
FIG. 2 illustrates an example of peer capacity management, in accordance with at least one embodiment.
Figure 2:
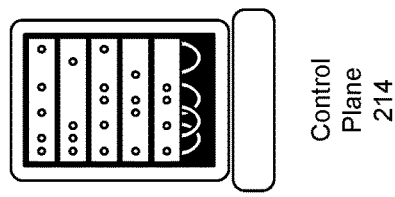
Figure 2:
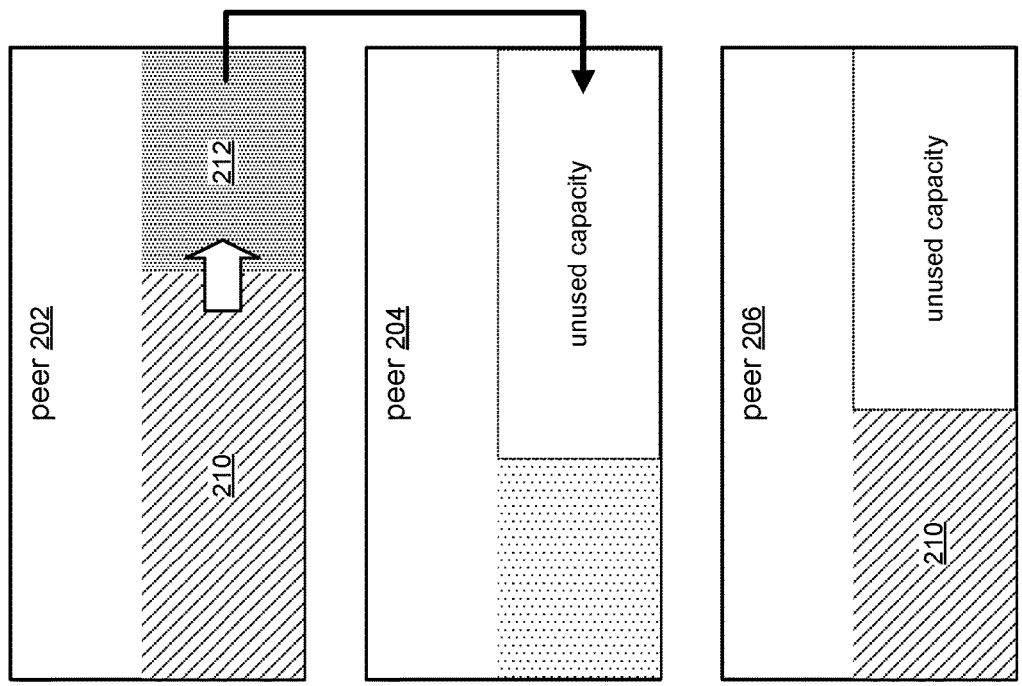

FIG. 2 illustrates an example of peer capacity management, in accordance with at least one embodiment. In the example 200 of FIG. 2, a peer refers to one or more nodes, such as a query processing node or storage node, to which a client may directly or indirectly connect. In an embodiment of the distributed database system 100 of FIG. 1, for example, the system 100 comprises query processing nodes and storage nodes to which a client might connect directly or indirectly in order to access data.

Each peer of a distributed database system may be associated with an amount of capacity. Here, capacity may refer, for example, to storage capacity, processing capacity, and so forth. The capacity of a peer may be fixed or variable, but may generally be limited to some maximum amount. In some cases, the distributed database system may impose minimum utilization amounts, such that underutilized peers are reallocated or removed from the system.

In the example 200 of FIG. 2, a control plane 214, which may correspond to the control plane depicted in FIG. 1, shifts capacity utilization between peers 202, 204, 206. The peers 202, 204, 206 may correspond to storage or query processing nodes of a distributed database system, such as the system 100 depicted in FIG. 1. The system may shift capacity utilization for a variety of reasons, such as to balance capacity utilization between clients, or to prevent one client's utilization from interfering with another client's utilization. For example, on a peer 202, the capacity utilization 210 of a first client might begin to interfere with the capacity utilization 212 of a second client. The control plane 214 might then shift capacity utilization associated with one of the clients to another peer 204.

In at least one embodiment of a distributed database system, the capacity utilization 210, 212 depicted in FIG. 2 corresponds to capacity utilized to maintain one or more tables or collections of data, or more or more partitions of a table or collection of data. For example, the capacity utilization 210 associated with a first client might be associated with the maintenance of tables, and partitions thereof, that are maintained by a distributed database on behalf of the first client. Likewise, the capacity utilization 212 associated with a second client might be associated with the maintenance of tables, and partitions thereof, that are maintained by the distributed database on behalf of the second client.

In at least one embodiment, a distributed database system facilitates connections to a selected set of peers, while limiting or preventing connection to peers not in the selected set of peers. In at least one embodiment, the selected set of peers are those peers associated with maintaining data owned by a particular client. For example, the peers 202, 206 might be included in the set of peers to which the first client might connect, and peer 202 provided to the second client, until such time as the second client's capacity utilization 212 is moved to another peer 204. The set of peers available to the second client can then be updated, so that only the newly associated peer 204 is included in the list.

In at least one embodiment, the distributed database uses the aforementioned techniques to emulate behaviors expected of a single-tenant database. For example, in at least one embodiment, an interaction protocol between a client and the distributed database is designed as a single tenant protocol, or without explicit support for multi-tenancy, but the client is nevertheless able to utilize a multi-tenant distributed database, such as the system 100 depicted in FIG. 1.

Figure 3:
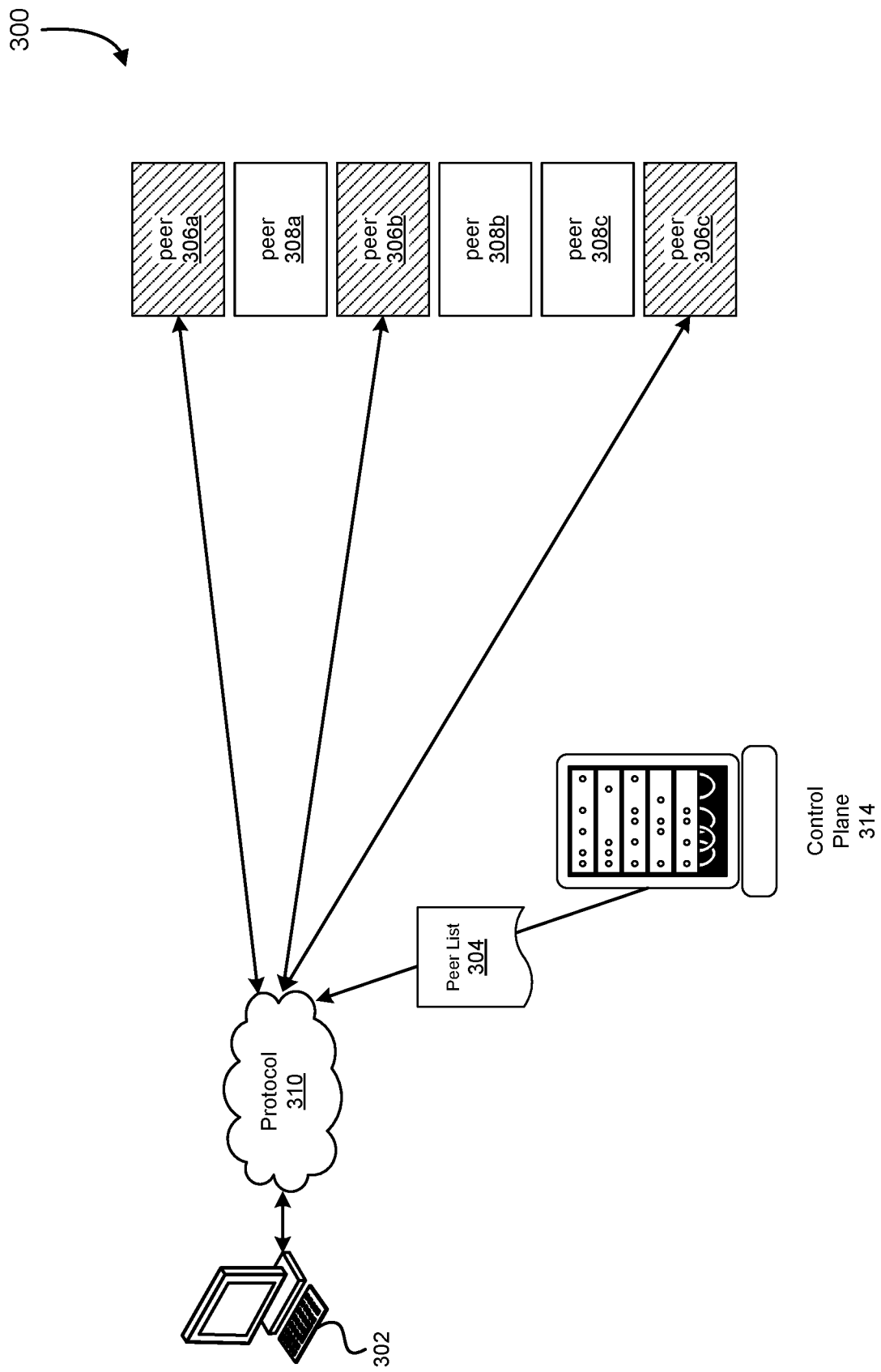
FIG. 3 illustrates an example of connection with a distributed database system, in accordance with at least one embodiment.

FIG. 3 illustrates an example of connection with a distributed database system, in accordance with at least one embodiment. In the example 300 of FIG. 3, a client 302 connects to peers of a distributed database system, such as the system 100 depicted in FIG. 1.

In at least one embodiment of a distributed database system, a protocol 310 is used to facilitate communication between a client 302 and a set of selected peers 306. The distributed database may comprise a plurality of peers 306, 308, including unselected peers 308.

A control plane 314 of the distributed database system, in at least one embodiment, identifies peers to include in the set of selected peers 306. When a connection between the client 302 and distributed database system is initiated, the system may respond by identifying the client initiating the connection and then selecting, for inclusion in the selected set of peers 306, those peers involved in maintaining data on behalf of the identified client.

In at least one embodiment, a peers list 304 is transmitted to the client 302 via the protocol 310. The peers list 304 comprises information pertaining to the set of selected peers 306. In at least one embodiment, this information includes an identifier or internet protocol ("IP") address of each peer, and information describing partitions or tables maintained by each peer.

In at least one embodiment, the client 302 implements a client-side of the protocol 310, and the distributed database implements the server-side of the protocol 310. For example, each of the peers 306, 308 may implement the server-side of the protocol 310.

In at least one embodiment, the client 302 receives the peers list 304 via operation of the protocol. For example, one or more messages comprising peer-list information may be sent to the client using a transmission format that is compliant with the protocol.

In a least one embodiment, the client 302 uses the peers list 304 to connect to one or more of the set of selected peers 306. The connections are made in accordance with the protocol. Peers not in the selected set, and therefore not included in the peers list 304, are not visible to the operation of the protocol 310. As used herein, a connection may refer to transient contact between a client and a peer, or to a persistent connection. Examples of connections therefore may include datagram protocol transmissions, transmission control protocol transmissions, hypertext transfer protocol ("HTTP") transmissions, and so forth, as well as the establishment of a persistent or ongoing communication session.

In at least one embodiment, the peers list 304 is dynamically updated. As described in reference to FIG. 2, the peers associated with a particular client may change over time. When a peer is added, a peer may be added to the set of selected peers, and the peers list 304 may be updated accordingly. In at least one embodiment, the protocol 310 is adapted to receive updates to the peers list. In some cases, and addition or removal of a peer, or a modification to the data stored on a particular peer, may cause the client 302 to initiate a shutdown or reconnection process.

Figure 4:
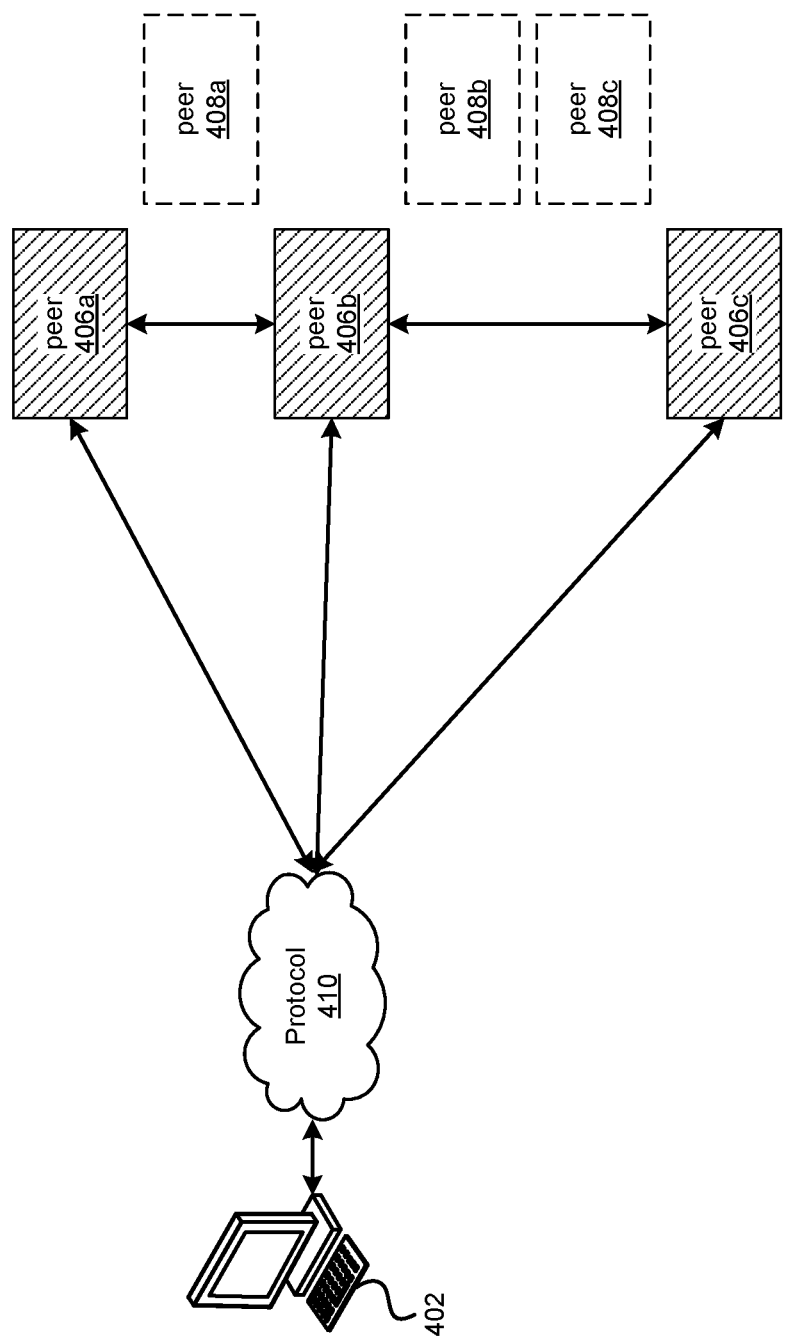
FIG. 4 illustrates an example of dynamic peer utilization in a distributed database system, in accordance with at least one embodiment.

A peers list may also, in at least one embodiment of a distributed database system, be used in conjunction with other operations of the system. FIG. 4 illustrates an example of peer utilization in a distributed database system, in accordance with at least one embodiment. In the example 400 of FIG. 4, a distributed database system, such as the system 100 depicted in FIG. 1, comprises peers 406 selected for use by the client 402, as well as other peers 408 not included in the set. A list of the peers selected for use by a particular client 402 may be referred to as the client's peers list.

In at least one embodiment, the peers list is provided to the client 402 and is used by the client-side implementation of an interaction protocol. For example, a client-side driver may implement the interaction protocol using a provided peers list.

In at least one embodiment, a query for information regarding the topology of the database system return a view of the topology that is restricted, or filtered, in view of the peers list.

In at least one embodiment, a client-side driver issues queries to one or more of the peers included in the peers list. For example, queries might be submitted, by a client-side driver, by selecting a destination for the query based on information in the peers list. The client-side driver might also selectively route queries to specific peers in the peers list, such as those associated with a particular table or partition. For example, a client-side driver might route a query involving a specific partition to a peer described, in the peers list, as maintaining data for that partition.

In at least one embodiment, replication between peers is facilitated by the peers list. For example, operation of a gossip protocol may be based, at least partly, on the information in a peers list. The gossip protocol may be an aspect of the protocol 410 used for communication between a client 402 and its selected peers. Likewise, operation of the gossip protocol excludes nodes not included in the peers list.

In at least one embodiment, a seed node is selected from among nodes in the peers list, and peer discovery if performed from among those peers present in a provided peers list. Likewise, peer discovery excludes those peers 408 not included in the peers list.

As described regarding FIG. 2, the peers associated with the client 402 may change over time. In at least one embodiment, the operation of a client and distributed database system is adapted to reflect any changes to the set of peers. For example, the operation of topology queries, query routing, or peer discovery is adapted, in at least one embodiment, to reflect an update to the selected set of peers.

Figure 5:
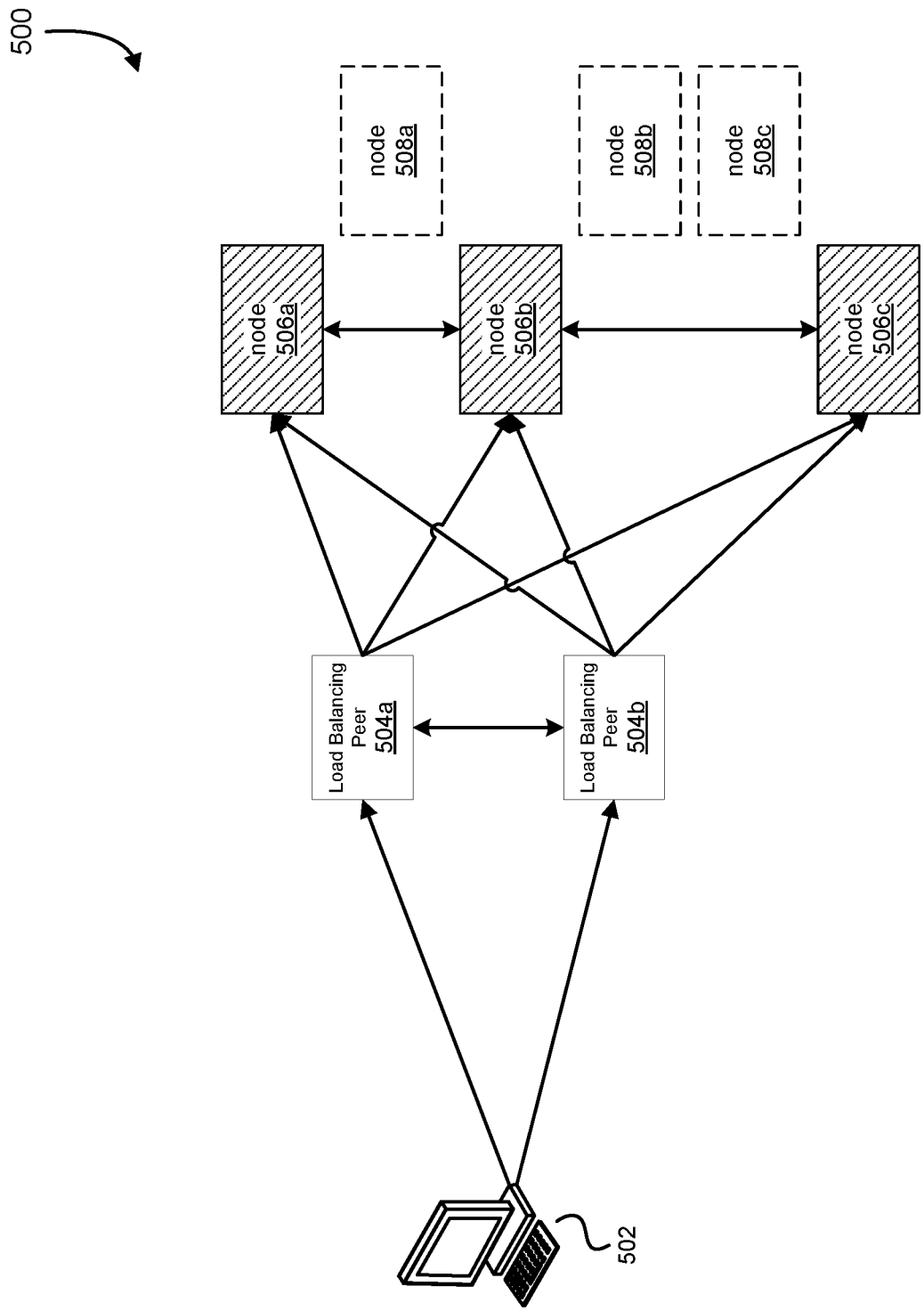
FIG. 5 illustrates an example of load balancing in a distributed database system, in accordance with at least one embodiment.

FIG. 5 illustrates an example of load balancing in a distributed database system, in accordance with at least one embodiment. In the example 500 of FIG. 5, a distributed database system, such as the distributed database system 100 depicted in FIG. 1, comprises a number of nodes 506, 508. Some of these nodes 506a-c are associated with the maintenance of data on behalf of a client. The distributed database system, being a multi-tenant system, comprises other nodes 508a-c that are not associated with that particular client, but are associated with other clients.

As described regarding FIG. 2, the peers associated with the client 502 may change over time. In at least one embodiment, the change to the set of selected peers is communicated to the client via operation of a protocol, such as the protocol depicted in FIG. 3.

In at least one embodiment, load balancing peers 504 routes queries to peers on the list of selected peers. For example, each of the selected nodes 506 might, in cases and embodiments, comprise replicas of the same partition. The load balancing peers 504 might then balance queries directed to that partition between each of the selected nodes 506, using a round-robin distribution pattern. The distribution pattern may be adjusted as nodes are added and removed from the set of nodes associated with maintaining a client's data.

In at least one embodiment, a load balancing device is presented to the client 502 as a peer. For example, the load balancing peers 504a-b may be included in place of nodes 506 in the peers list. The client may then connect to the distributed database via the load balancing peers 504a-b, and these in turn may direct traffic among those nodes 506 which are to be associated with the maintenance of the client's data.

In at least one embodiment, the load balancers 504a-b and a nodes 506a-c are operative on the same computing device. For example, a node 506a-c may have an integrated load balancing function. In at least one embodiment, a query processing node performs a load balancing function, and may distributed forward a query it receives to another node, which may server a load balancing purpose.

In at least one embodiment, peers are included in a peers list in order to manage network traffic. For example, a peer might be included in a peers list based on factors such as the location of the client, the location of the peer, network traffic along a network route between a client and a peer, and so forth. In another example, the geographic location of a client and its peer are considered. By selecting peers that are geographically closers to a client than other comparable peers, overall network traffic may be improved. In another example, certain peers are excluded from the selected set of peers, for reasons such as avoiding peers whose workload might interfere with the client's workload, separating the activities of certain clients, avoiding network bottlenecks, and so on. These and other examples are illustrative of techniques for selecting peers for inclusion in the peers list in order to route, or otherwise manage, network traffic.

In at least one embodiment, a load balancer 504 is implemented by a client-side driver, and bases its distribution of queries on a peers list received and maintained via an interaction protocol.

FIG. 6 illustrates an example of client view of peer metadata, in accordance with at least one embodiment. It will be appreciated that the depicted example of peer metadata 600 is intended to be illustrative rather than limiting, and as such FIG. 6 should not be construed in a manner which would limit the present disclosure to only those embodiments that include the specific example provided.

In at least one embodiment, peers metadata 600 is maintained by a distributed database management system as one or more tables. Each row in the table may correspond to a peer. A table comprising peer metadata may be stored as part of a system catalog, system schema, and so forth.

In at least one embodiment, peer metadata 600 comprises an address, peer version, schema version, token range, and client indicator. It will be appreciated that these examples are intended to be illustrative rather than limiting, and as such FIG. 6 should not be construed in a manner which would limit the present disclosure to only those embodiments that include the specific examples provided. In at least one embodiment, the address corresponds to an IP address to which attempts to connect to the peer are made. The peer version may indicate a version of the software installed on the peer, such as the version number of a query engine or storage interface. The token range may indicate a range of data stored on the system. Note that although FIG. 6 depicts the ranges as alphabetic ranges, at least some embodiments employ alternative range indicators, such as indicators which allow identification of the peer on which a data item is stored using the output of a hash function. The client column may indicate which client or clients are associated with a particular peer.

In at least one embodiment, a client view of peer metadata 600 is restricted, such that the system catalog appears to contain only metadata for that particular client, even though the distributed database system is a multitenant system. As depicted in FIG. 6, rows 604 are included in a client's view of the peer metadata 600, but other rows 602 are excluded. In addition, certain columns 606 of the metadata are excluded because they include information relevant to other clients.

Figure 7:
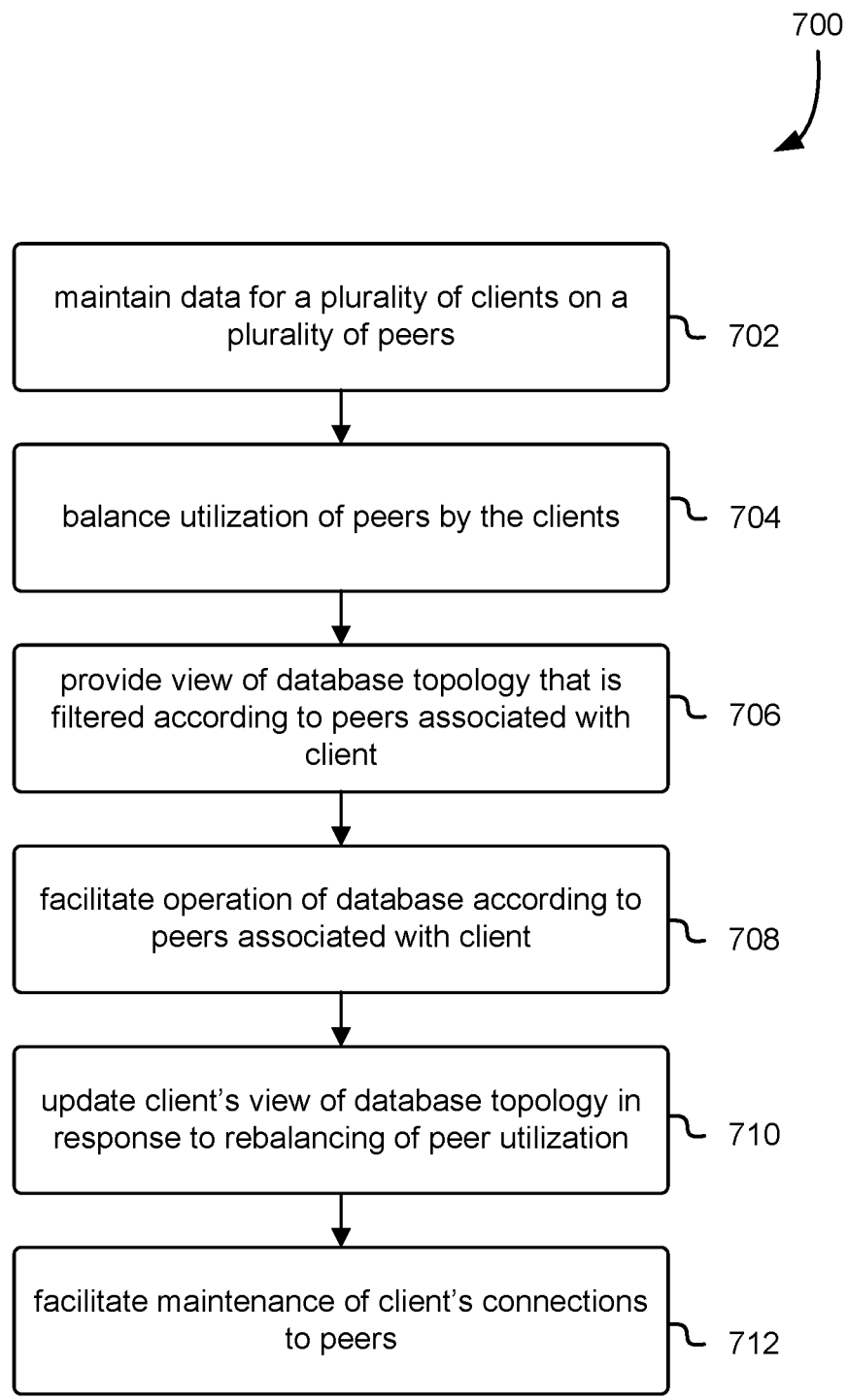
FIG. 7 illustrates an example process of operating a multitenant distributed database, in accordance with at least one embodiment.

FIG. 7 illustrates an example process of operating a multitenant distributed database, in accordance with at least one embodiment. The example process 700 may be performed by any suitable computing system or combination of systems, including for example the servers depicted in FIG. 9.

Although FIG. 7 is depicted as a series of steps or operations, the depicted sequence should not be viewed as limiting the scope of the present disclosure to only those embodiments that conform to the depicted sequence. For example, in various embodiments, the steps or operations depicted in FIG. 7 may be altered, reordered, or omitted, except where explicitly stated or where logically required, such as when an input to one step or operation is obtained from an output of another step or operation.

At 702, a distributed database management system maintains data on behalf of a plurality of clients. The distributed database management system maintains the data on a plurality of peers. In at least one embodiment, each peer comprises one or more query processing and/or storage nodes.

In at least one embodiment, a peer of the distributed database management system maintains a plurality of data partitions. Each of the partitions may be associated with a different client. Consequently, the peer may be described as being multi-tenant.

In at least one embodiment, operation of the peer is based, at least partly, on the identity of a connecting client. For example, when a client connects with the database to perform an operation, the scope of available operations may be based on the client's identity. The system permits the client to access peers that are associated with that client, but does not permit access peers that are not associated with the client. In at least one embodiment, the association between a peer and client is related to whether or not the peer stores data the client is authorized to access, or in some cases whether the peer is authorized to store data on behalf of the client.

At 704, the distributed database management system balances utilization of the peers by clients of the system. For example, the distributed database system may, in at least one embodiment, periodically add, remove, or reassign peers so that utilization by various clients is appropriately balanced between peers. In some cases, distributed database might add new peers and make the new peers dedicated to maintaining data exclusively on behalf of a single client. In other cases, the distributed database add peers to support multiple clients. In still other cases, the distributed database management system might move partitions between peers to balance utilization between those peers.

At 706, the distributed database management system provides, to a client, a view of the database topology that is filtered according to the peers associated with that client.

In at least one embodiment, the system provides a peers list to the client. The peers list comprises a list of peers that are associated with the client, by virtue of storing or to be used to store data on behalf of the client. For the included peers, the list may include identifying information, such as universally unique identifier ("UUID"), a domain name server ("DNS") name, an IP address, and so forth. The system excludes peers not associated with the client, so that the system appears, from the client's point of view, to only contain peers that store, or are intended to store, the particular client's data.

In at least one embodiment, queries for system metadata are filtered according to the peers associated with a client. For example, a client might query a system catalog in order to obtain a peers list. The distributed database system may exclude, from the results of the query, references to peers that are not relevant to maintaining the client's data.

In at least one embodiment, a client-side driver receives the peers list information and uses it to communicate with the distributed database system. For example, in at least one embodiment, each peer in the peers list is a full or partial replica of a collection of data, and a query of the collection of data may be issued to any peer. The client-side driver may perform load balancing by sending outgoing queries to the peers in the list. Similarly, if the peers list includes information describing the ranges of partitions stored on behalf of the client be the respective peers, the client-side driver might make query routing decisions based on the peer information.

At 708, the distributed database management system facilitates operation of the distributed database according to the peers associated with the client. The facilitation of operation of the distributed database system may, in various embodiments, comprise a variety of operations enabled or assisted by the information contained in or provided by the peers list.

In at least one embodiment, operation of a client-side driver is based at least in part on the peers list. Examples of operations of the client-side driver that may involve the peers list include selecting from among a variety of peers to connect to. Since the distributed database is multitenant, the availability of the peers list allows the client-side driver to restrict its connection attempts to only those peers that may have the client's data, or that may participate in data replication or quorum decisions relevant to the client's data.

At 710, the distributed database management system updates the client's view of the database topology in response to rebalancing of peer utilization. More generally, the distributed database system may update the client's view of the database topology in response to an addition, removal, or change of a peer. The notification, in at least one embodiment, is made by providing an updated peers list, or by providing data describing an incremental update to the peers list.

At 712, the distributed database management system facilitates the maintenance of a client's connections to peers. This may involve the same or similar operations as at 710, coupled with responses to the client's requests to drop, add, or modify connections in response to an update to the peers list. For example, if a peer is dropped from the list, the distributed database system may notify the client, and the client-side driver may terminate its connection to the dropped peer, identify a replacement in the updated peers list, and attempt to reconnect.

Figure 8:
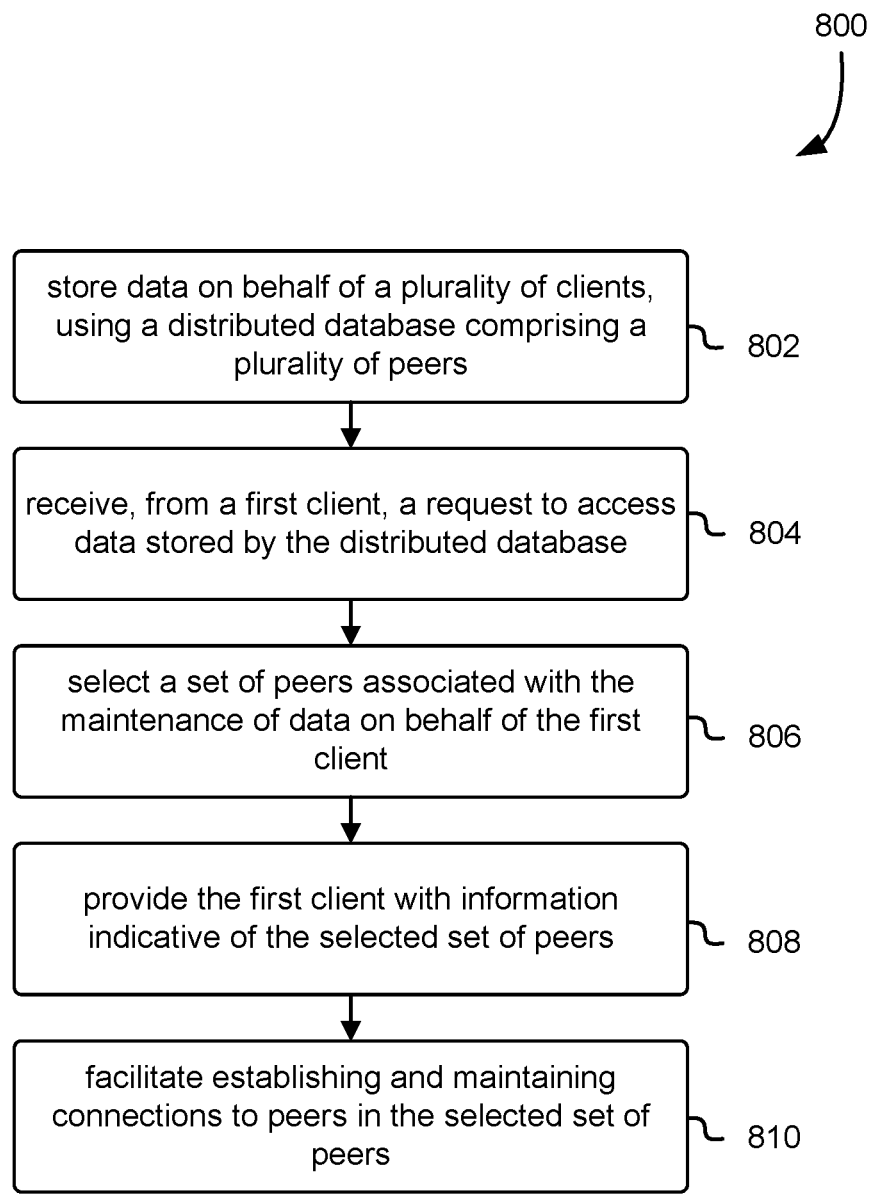
FIG. 8 illustrates an example process of operating and interaction with a multitenant distributed database, in accordance with at least one embodiment.

FIG. 8 illustrates an example process of operating and interaction with a multitenant distributed database, in accordance with at least one embodiment. The example process 800 may be performed by any suitable computing system or combination of systems, including for example the servers depicted in FIG. 9.

Although FIG. 8 is depicted as a series of steps or operations, the depicted sequence should not be viewed as limiting the scope of the present disclosure to only those embodiments that conform to the depicted sequence. For example, in various embodiments, the steps or operations depicted in FIG. 8 may be altered, reordered, or omitted, except where explicitly stated or where logically required, such as when an input to one step or operation is obtained from an output of another step or operation.

At 802, data is stored by a distributed database system on behalf of a plurality of clients. The distributed database system comprises a plurality of peers. Each peer may be dedicated to a particular client, or may serve many clients. As described herein, the distributed database system may periodically adjust how capacity is utilized between the various clients of the system, in order to utilize existing resources more efficiently, to reduce the chance that the activities of one client would adversely impact another client, and so on. Consequently, the set of peers associated with a particular client, at any given time, may change.

At 804, the distributed database system receives, from a first client, a request to access data that has been stored by the distributed database. The request may be described, in general terms, as an attempt to connect to the distributed database in order to obtain data.

At 806, the distributed database system selects a set of peers that are associated with maintenance of data on behalf of the first client. As described herein, a client's data may be stored on a subset of the peers of the distributed database. The distributed database may therefore select the peers based on whether or not they store data associated with the client associated with the connection.

At 808, the distributed database system provides the first client with information indicative of the selected set of peers. This may comprise a peers list, as described for example in relation to FIG. 6, or other data comprising similar information. The data may be transmitted during or in response to an attempt to connect with the distributed database, e.g. during operation of an interaction protocol between the client and distributed database system.

At 810, the distributed database system facilitates establishing and maintaining connections to peers in the selected set of peers. In a least one embodiment, the distributed database transmits notifications of updates to the peers to a client, and the client responds by terminating any connections to a peer that has been dropped from the selected set of peers, and initiating connections to peers that have been added.

In an example embodiment, a system comprises at least one processor and a memory that stores executable instructions that, in response to execution by the at least one processor, cause the system to at least receive a request to access data stored by a distributed database. The distributed database comprises a plurality of peers. The request is associated with a first client, of a plurality of clients of the distributed database.

In this example embodiment, the instructions, in response to execution by the at least one processor, cause the system to select peers for inclusion in a set of peers. The selected peers are those on which at least one partition associated with the first client is maintained.

In this example embodiment, the instructions, in response to execution by the at least one processor, cause the system to provide the first client, in response to the request, with information indicative of the set of selected peers. The first client then obtains access to the data based at least in part on connection to one or more of the set of peers.

In a further embodiment of this example, the system notifies the first client of an addition or removal of a peer from the set of peers.

In a further embodiment of this example, a peer, of the plurality of peers, maintains data on behalf of the first client and one or more additional clients.

In a further embodiment of this example, a peer, of the plurality of peers, maintains data exclusively on behalf of the first client.

In a further embodiment of this example, a client-side driver communicates with the distributed database based at least in part on the information indicative of the set of selected peers.

In an example embodiment, a computer-implemented method of operating a distributed database comprises steps or operations which include maintaining, by the distributed database, data on behalf of a plurality of clients. The distributed database comprises a plurality of peers, each maintaining one or more partitions of data. Some of the peers may each maintain partitions of data exclusively on behalf of a particular client, while other peers may each maintain partitions of data on behalf of a number of clients.

This example embodiment of a computer-implemented method further comprises receiving a request to access data maintained by the distributed database on behalf of a first client of the plurality of clients. For example, a request issued by the first client to the distributed database may be a request to access data on behalf of the first client, although there may be some cases in which another entity acts as a proxy for the first client, and is considered to be requesting data maintained by the distributed database system on behalf of the first client.

This example embodiment of a computer-implemented method further comprises selecting, from among the plurality of peers of the distributed database, a set of peers associated with maintenance of the data on behalf of the first client. A peer may be selected for inclusion in the set of selected peers based on the peer maintaining a partition of data on behalf of a client, or based on the peer being intended to maintain such a partition. Other criteria may also be considered, such as which collection of data a client intends to access.

This example embodiment of a computer-implemented method further comprises providing information indicative of the set of selected peers to the first client, where the first client obtains access to the data by at least connecting, based on the information, to one or more of the set of selected peers.

In a further embodiment of this example method, a peer is selected for inclusion in the set of selected peers based, at least in part, on the peer maintaining a partition comprising data associated with the first client.

In a further embodiment of this example method, the method comprising allocating an additional peer to maintain data on behalf of the first client, and notifying the first client of the additional peer.

In a further embodiment of this example method, the plurality of peers, maintains data for the first client and one or more additional clients.

In a further embodiment of this example method, a first peer, of the plurality of peers, maintains data only on behalf of the first client.

In a further embodiment of this example method, the data maintained on behalf of the first client comprises a table partitioned across two or more of the set of selected peers.

In a further embodiment of this example method, the information indicative of the set of selected peers comprises information usable to connect to one or more of the set of selected peers.

In a further embodiment of this example method, the information indicative of the set of selected peers comprises information indicative of partition ranges for the set of selected peers.

In an example embodiment, a non-transitory computer readable medium comprises instructions that, when executed by at least one processor of a computing device, cause the computing device to perform any of the embodiments of the computer-implemented method just described.

Figure 9:
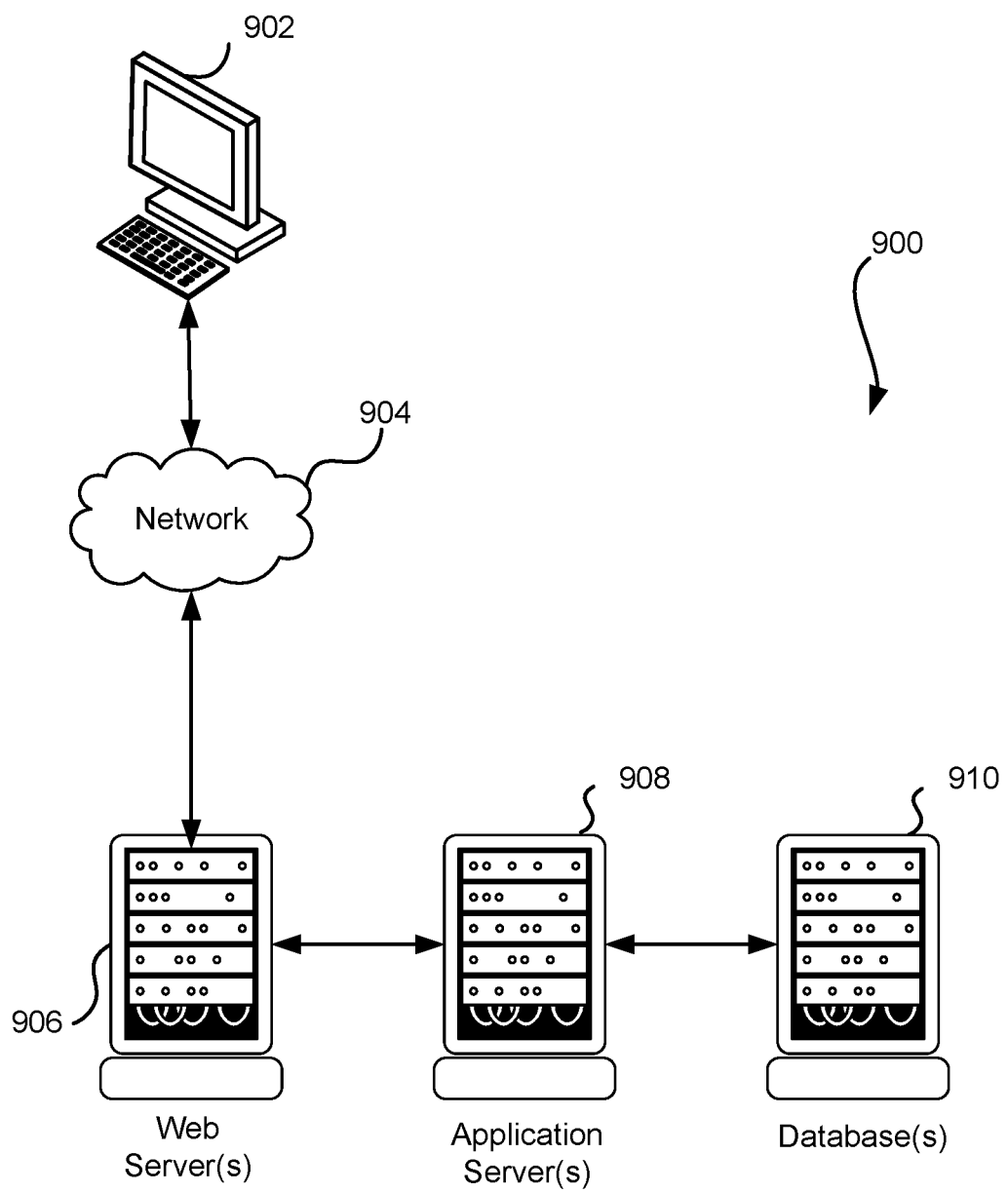
FIG. 9 illustrates an example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and one or more databases 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The one or more databases 910, in an embodiment, includes several separate data tables, databases, data documents, dynamic data storage schemes and/or other data storage mechanisms and media for storing data relating to a particular aspect of the present disclosure. The one or more databases 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. The one or more databases 910 correspond, in various embodiments, to a distributed database system, such as the system depicted by FIG. 1.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising executable instructions that, in response to execution by the at least one processor, cause the system to at least:
      receive a request to access a table of data maintained by a distributed database comprising a plurality of nodes, the request associated with a first client of a plurality of clients of the distributed database;
      select, from among the plurality of nodes, one or more nodes for inclusion in a set of nodes to assist in maintenance of the table of data on behalf of the first client, wherein each node of the set of nodes is associated with the first client; and
      provide the first client, in response to the request, with information indicative of the set of selected nodes, wherein the first client issues queries of the table of data based at least in part on connection to one or more of the set of nodes.

2. The system of claim 1, wherein the executable instructions, in response to execution by the at least one processor, cause the system to at least:
   notify the first client of an addition or removal of a node from the set of nodes.

3. The system of claim 1, wherein a node, of the plurality of nodes, is associated with maintenance of data on behalf of the first client and one or more additional clients.

4. The system of claim 1, wherein a node, of the plurality of nodes, is associated with maintenance of the table of data exclusively on behalf of the first client.

5. The system of claim 1, wherein a client-side driver communicates with the distributed database based at least in part on the information indicative of the set of selected nodes.

6. A computer-implemented method, comprising:
   maintaining, by a distributed database comprising a plurality of nodes, data on behalf of a plurality of clients;

receiving a request to access a collection of data maintained by the distributed database on behalf of a first client of the plurality of clients;

selecting, from among the plurality of nodes of the distributed database, a set of nodes associated with maintenance of the collection of data on behalf of the first client, wherein nodes of the set of nodes are each associated with the first client; and providing information indicative of the set of selected nodes to the first client, wherein the first client sends a query of the collection of data by at least connecting, based on the information, to one or more of the set of selected nodes.

7. The computer-implemented method of claim 6, further comprising:

selecting a node for inclusion in the set of selected nodes based, at least in part, on the node maintaining a partition comprising data associated with the first client.

8. The computer-implemented method of claim 6, further comprising:

allocating an additional node to maintain data on behalf of the first client; and notifying the first client of the additional node.

9. The computer-implemented method of claim 6, wherein a node, of the plurality of nodes, maintains data for the first client and one or more additional clients.

10. The computer-implemented method of claim 6, wherein a node, of the selected set of nodes, performs a load balancing function.

11. The computer-implemented method of claim 6, wherein nodes are selected for inclusion in the selected set of nodes based at least in part on routing of network traffic.

12. The computer-implemented method of claim 6, wherein the information indicative of the set of selected nodes comprises information usable to connect to one or more of the set of selected nodes.

13. The computer-implemented method of claim 6, wherein the information indicative of the set of selected nodes comprises information indicative of partition ranges for the set of selected nodes.

14. A non-transitory computer-readable storage medium having stored thereon executable instructions that, in response to being executed by one or more processors of a computing device, cause the computing device to at least:

receive a request to access a collection of data stored by a distributed database, the request associated with a first client of a plurality of clients;

select, from among a plurality of nodes of the distributed database, a set of nodes associated with maintenance of data on behalf of the first client, wherein each node of the set of nodes stores data on behalf of the first client; and provide information indicative of the set of nodes, wherein the first client sends a query of the collection of data by at least connecting, based on the information, to one or more of the set of nodes.

15. The non-transitory computer-readable storage medium of claim 14, having stored thereon further executable instructions that, in response to being executed by one or more processors, cause the computing device to at least:

select a node for inclusion in the set of selected nodes based, at least in part, on the node comprising a partition comprising data the first client is authorized to access.

16. The non-transitory computer-readable storage medium of claim 14, having stored thereon further executable instructions that, in response to being executed by one or more processors, cause the computing device to at least:

send, to the first client, a notification that a node has been added or removed from the set of nodes.

17. The non-transitory computer-readable storage medium of claim 16, wherein a client-side driver connects to at least one of a new or modified node in response to the notification.

18. The non-transitory computer-readable storage medium of claim 14, wherein a client load-balances requests between nodes of the selected set of nodes.

19. The non-transitory computer-readable storage medium of claim 14, having stored thereon further executable instructions that, in response to being executed by one or more processors, cause the computing device to at least:

select a node for inclusion in the selected set of nodes based at least in part on a factor associated with management of network traffic.

20. The non-transitory computer-readable storage medium of claim 14, wherein operation of a client-side driver is based, at least in part on, on the information indicative of the set of nodes.

\* \* \* \* \*